May 25, 1954   E. K. CLARK   2,679,203
TOASTER STRUCTURE
Filed Sept. 29, 1950   2 Sheets-Sheet 1
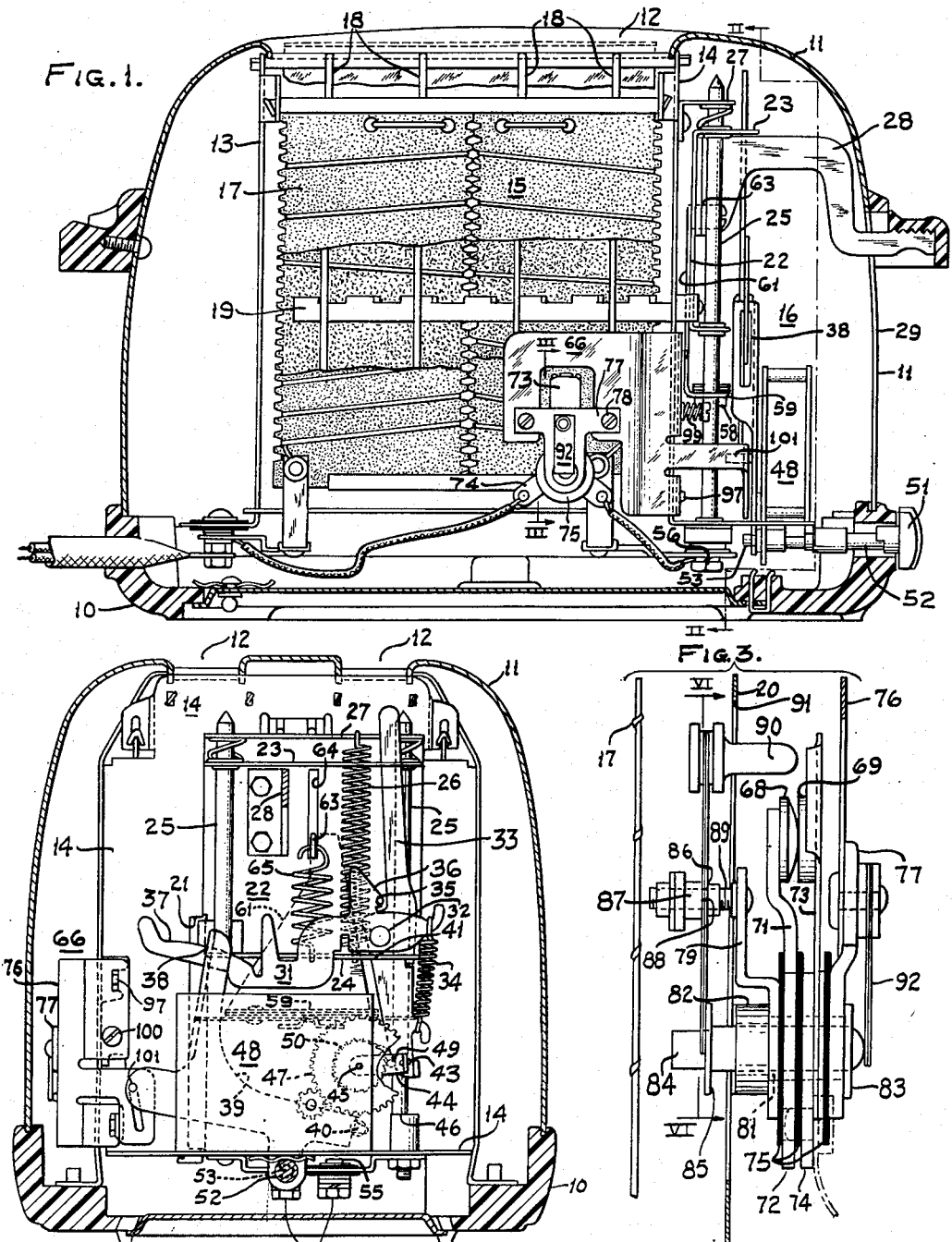
Fig. 1.
Fig. 2.
Fig. 3.
WITNESSES:
INVENTOR
EARL K. CLARK
BY 
ATTORNEY May 25, 1954  E. K. CLARK  2,679,203
TOASTER STRUCTURE
Filed Sept. 29, 1950  2 Sheets-Sheet 2

WITNESSES:

INVENTOR
EARL K. CLARK.
BY
ATTORNEY

Patented May 25, 1954

2,679,203

UNITED STATES PATENT OFFICE 2,679,203

TOASTER STRUCTURE

Earl K. Clark, Mansfield, Ohio, assignor to Westinghouse Electric Corporation, East Pittsburgh, Pa., a corporation of Pennsylvania Application September 29, 1950, Serial No. 187,402

4 Claims. (Cl. 99—327)

This invention relates to automatically controlled, electrically heated bread toasters and has for an object to provide improved apparatus of this kind.

A further object of the invention is to uniformly toast bread slices to a preselected degree or color regardless of the temperature of the toaster structure at the beginning of a toasting operation or the voltage of the circuit energizing the heater of the toaster.

In applying the invention to an oven or so-called "pop-up" toaster, a timer is employed for retaining the slice carriage in toasting position for preselected fixed periods of time for toasting the slices to different degrees or colors. The heaters are conditioned for energization in the toasting position of the carriage under control of a thermostat disposed to directly receive radiant heat from the main heaters of the toaster. The thermostat responds to predetermined low and high temperatures for respectively energizing and deenergizing the heaters within the selected fixed period of time as determined by the timer. The periods of heating and cooling of the thermostat are a function of the ambient temperature and the voltage of the circuit energizing the main heaters. The thermostat is so designed that it will reach its deenergizing temperature just at the end of the shortest period of operation provided by the timer and when the voltage impressed on the heaters is at its lowest expected value and during a first operation of the toaster when the ambient temperature is low. Under other conditions, the thermostat cycles during periods of operation provided by the timer. With a relatively high voltage, the thermostat will begin cycling sooner than when the voltage is low and also will remain closed a smaller part of the complete cycle than when the voltage is low.

As described more in detail hereinafter, the spacing between the thermostat structure and the heater is varied with adjustments of the timer. Briefly stated, the purpose of this operation is, primarily, to obtain a greater range in the color of toast produced by the toaster, lower average wattage during the toasting cycle with the thermostat in the close position (light setting) and higher average wattage during the toasting cycle with the thermostat in the farthest position from the heater (dark setting).

The foregoing and other objects are effected by the invention as will be apparent from the following description and claims taken in connection with the accompanying drawings, forming a part of this application, in which:

Fig. 1 is a longitudinal vertical sectional view taken through a toaster constructed and arranged in accordance with my invention;

Fig. 2 is a transverse sectional view taken along the line II—II of Fig. 1, looking in the direction of the arrows;

Fig. 3 is a vertical sectional view of a thermostat, taken along the line III—III of Fig. 1. This view has been made to an enlarged scale compared to Fig. 1;

Figure 4:
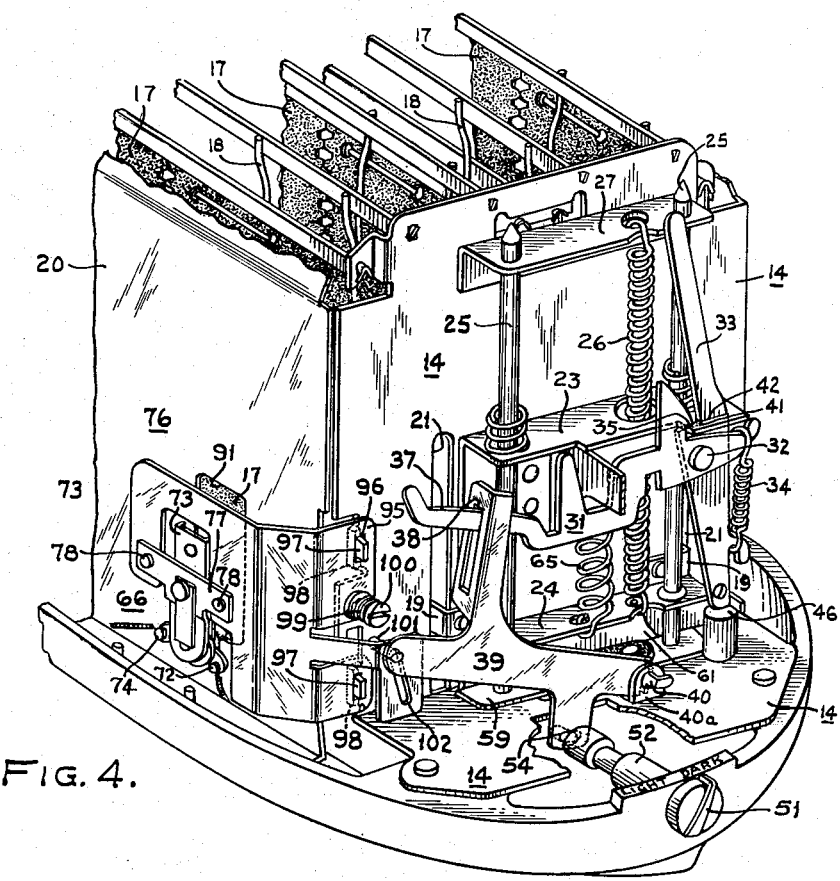
Fig. 4 is a fragmentary perspective view of the toaster construction with the shell or casing removed.

Reference will now be had to the drawings, wherein I have elected to show my invention applied to a two-slice toaster of the oven type and including a base 10 having a casing or shell 11 supported thereon in any well-understood manner, which casing 11 is provided with the usual slice openings 12 on the top side thereof. Arranged interiorly of the casing 11 are partitions 13 and 14 which divide the casing into a toasting oven generally indicated at 15 and an apparatus compartment 16. Arranged within the toasting oven 15 are a plurality of conventional flat heating elements 17 extending longitudinally of the oven 15 and carried by the partitions 13 and 14 in any well-understood manner. The heating elements 17 define two toasting wells within the oven 15 and the slices disposed in the wells are properly positioned therewithin by the usual vertical guard wires 18. As shown, reflecting plates 20 are arranged within the casing 11 for reflecting heat inwardly of the casing toward the toasting wells.

The slices are supported within the toasting wells by slice bars 19 of any well-understood construction and which extend through openings 21, formed in the partition 14, into the apparatus compartment 16. The slice bars 19 are suitably fixed to a carriage 22 having horizontally extending flange portions 23 and 24 provided with suitable openings for receiving fixed vertical guide rods 25, the latter being attached in any suitable manner to the partition 14. The carriage 22 is biased upwardly at all times by a main tension spring 26, the lower end of which is attached to the flange 24 of the carriage and the upper end of which is supported by a plate 27 fixed to the partition 14. The carriage 22 is also provided with a handle 28 which extends outwardly therefrom through a slot 29 formed in the casing 11. In operation, it will be understood that the handle 28 is depressed from the position shown in Fig. 2, which is the nontoasting position of the bread carrier or carriage 22 to a lower toasting position, as shown in Fig. 4. The return of the carriage 22 to its upper nontoasting position is automatically effected at the end of the toasting period as described hereinafter.

The carriage is retained in its lower toasting position by a time-controlled latching mechanism arranged within the apparatus compartment 16 and which will now be described. The latching mechanism includes a latch member, generally indicated at 31, which is pivoted, as shown at 32, to a substantially vertical bar 33. The latch 31 is biased about its pivot in clockwise direction at all times by a tension spring 34, secured at one end to the latch and at its lower end to the bar 33. The latch member 31 includes a catch 35 provided with a camming surface 36 and also a restraining surface 37 which is engageable with a stop 38 formed on an adjustable lever 39 to be referred to hereinafter. The lever 39 is pivoted, as shown at 40, to a fixed ear 40a carried by partition 14. The catch 35 is engageable with a projection 41 formed on the upper flange 23 of the carriage, as shown in Fig. 4, for coupling the carriage 22 to the latching member 31 and the bar 33. As best shown in Fig. 4, the bar 33 is slidable within an opening 42 formed in the flange 23. The lower end of the bar 33 is pivoted, as shown at 43, to an arm 44 which is loosely supported by a shaft 45 for relative clockwise movement thereabout. Downward movement of the bar 33 is limited by a fixed stop 46 which is engaged by the bar 33 when the carriage is moved to toasting position, as shown in Fig. 4.

The shaft 45 is fixed to a gear 47 which defines the driving gear of a suitable clock mechanism, indicated generally at 48. The clock mechanism may be of any well-understood construction and is preferably of the type shown in McCullough Patent No. 2,362,836, granted November 14, 1944. This form of clock is not self-motivated but is driven when a torque is applied to the gear 47. The gear 47 is driven by a ratchet wheel 50 and a pawl 49, the latter being pivoted to the arm 44. From this description it will be understood that, in the toasting position as shown in Fig. 4, the main spring 26 while biasing the carriage upwardly imparts an upward force to the bar 33 which, as pointed out, is now coupled to the carriage. The bar 33 imparts a counterclockwise torque to the ratchet 50 through the pawl 49. Accordingly, the clock 48 is driven at this time during the toasting operation. It will be apparent that, during the toasting operation, the carriage 22 and the latch 31 which is now coupled thereto moves slowly upwardly at a speed determined by the clock 48.

During this upward movement, the restraining surface 37 of the latch 31 engages the stop 38 so that continued upward movement of the pivot point 32 effects counterclockwise movement of the latch 31 about the pivot 32. Accordingly, the catch 35 is moved out of engagement with the projection 41 whereupon the latch 31 and bar 33 are uncoupled from the carriage 22 and the latter then moves rapidly upwardly to the nontoasting position, as shown in Fig. 2, under the influence of the tension spring 26. Of course, the uncoupling of the bar 33 from the carriage terminates the torque applied to the ratchet 50 so that the clock stops and, at the same time, the bar 33 will fall by gravity into engagement with the stop 46, the pawl 49 at this time riding freely over the teeth of the ratchet 50.

It will be pointed out at this time that, during the latching of the carriage 22 to the latch 31 and bar 33, the projection 41, moving downwardly, first engages the camming surface 36 which swings the latch 31 counterclockwise about the pivot 32 and, after the projection 41 has passed beneath the catch 35, the spring 34 swings the latch 31 clockwise to move the catch 35 above the projection 41 in locking position. During this last operation, it will be understood that the bar 33 is resting on the stop 46. Accordingly, the carriage and the bar 33 coupled thereto are always moved to the same position at the beginning of a toasting operation as determined by the height of the stop 46.

The period of time that the carriage 22 is retained in toasting position is determined by the position of the stop 38 relative the restraining surface 37 of the catch 35. The stop 38 is manually adjustable generally upwardly and downwardly to determine the duration of the toasting period or, in other words, the period of time that the carriage 22 is latched to the member 31 and bar 33. The position of the stop 38 is preferably adjusted by a color control handle 51, located in a convenient location at the end of the toaster and including a shaft 52 suitably journaled in the base and having an eccentric pin 53 formed on the inner end thereof. The pin rides within a slot 54 formed in the lever 39. As best shown in Fig. 4, the color knob 51 is in the "dark" position so that the stop 38 is in its most elevated position. Accordingly, the duration of the toasting period is maximum. Counterclockwise movement of the color knob 51 will cause counterclockwise movement of the lever 39 about its pivot 40 and a depression of the stop 38. Therefore, the latch member 31 is tripped earlier during the slow upward movement thereof than when the color knob 51 is in the position shown.

In accordance with this invention, the periods of time during which the carriage is in the toasting position are fixed regardless of whether the toaster is being operated for the first time or after several toasting operations have been completed. For example, in one form of toaster successfully tested by me, toasting periods of 60 seconds, 95 seconds and 130 seconds, are, respectively, employed for light, medium and dark toast.

It will be understood, that the heaters 17 are only energized in the lower toasting position of the carrier 22. Any conventional switching structure actuated by the carriage 22 may be employed for this operation. As shown, the switching structure includes a pair of stationary contacts 55, one of which is clearly shown in Fig. 2 while the other is hidden, and both of which include terminal portions 56 shown in this figure. Contacts 55 are insulatedly carried by a fixed bracket 57 and are engaged by a bridging contact 58 which is insulatedly carried by a flange 59 which forms a part of a plate 61. The latter is slidably mounted with respect to and immediately behind the carriage 22 and includes a projection 63 which extends through a slot 64 formed in the carriage 22 (see Figs. 1 and 2). A tension spring 65 is connected to the projection 63 and the flange 24 so that the bridging contact 58 is always biased downwardly with respect to contacts 55. As the carriage 22 is depressed to its toasting position, the bridging member 58 first engages the contacts 55 and further depression of the carriage 22 extends the spring 65 for firmly pressing the bridging member 58 toward the contacts 55. Contact between the bridging member 58 and the contacts 55 is maintained during the slow upward movement of the carriage 22, as described; the spring 65 contracting during such movement.

Figure 5:
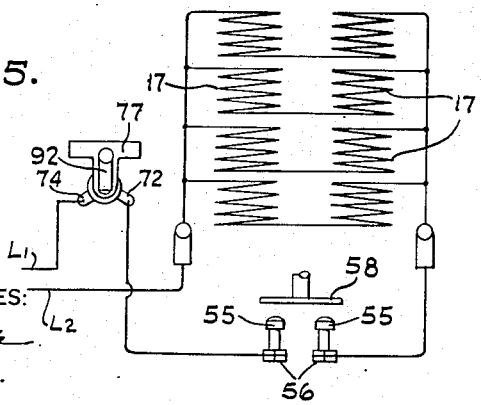
Fig. 5 shows a schematic diagram of electrical connections for the toaster unit.
Figure 6:
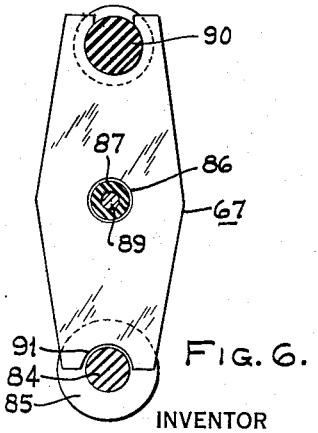
Fig. 6 is a sectional view taken in the plane VI—VI of Fig. 3.

In accordance with my invention, energization of the heating elements 17 is controlled by a thermostatically operated switching structure, generally indicated at 66, during toasting periods when the switching elements 55—58 are engaged. The electrical connections for the heaters 17 are shown in Fig. 5 wherein the source of power is represented by conductors $L_1$—$L_2$, usually defining a conventional 115-volt lighting circuit. It will be noted the thermostatically operated switching structure 66 is in series with the contacts 55 and the heating elements 17, the latter being connected in parallel, as shown.

The thermostatically operated switch structure 66 includes a bimetal element 67, a fixed contact 68 and a movable contact 69. The fixed contact 68 is supported by a plate 71 having a terminal portion 72 and the movable contact 69 is carried by a resilient arm 73 which is electrically connected to a terminal 74. The plate 71 and terminal 74 are insulated from each other by insulating washers 75. The thermostat structure 66 also includes a main frame 76, a T-shape member 77 secured thereto by screws 78, a supporting arm 79 for the bimetal 67 and a collet 81. The latter includes a shoulder 82 and an end 83 which is spun over to bind the arm 79, insulating washers 75, the plate 71, terminal 74 and resilient arm 73 and T-shaped member 77 together as a unit. The collet 81 is hollow to slidably receive a pin 84 having a shoulder 85 which defines a reaction point for the lower end of the bimetal 67.

The bimetal 67 is supported at its center wherein an opening 86 is provided for receiving a nut 87 having a shoulder 88, which nut 87 is adjustably threaded on a screw 89 carried by the arm 79. After proper adjustment of the nut 87 is made, it is secured to the screw 89 in any suitable manner. The upper end of the bimetal 67 carries an insulating finger 90 which is engageable with the resilient arm 73 for separating the contact 68—69 in response to a predetermined high temperature of the bimetal 67. The finger 90 is secured to the bimetal 67 in any suitable manner as, by crimping the bimetal about the finger 90. The lower end of the bimetal 67 is recessed, as shown at 91, to receive the pin 84 and the opening 86 in the bimetal affords some clearance between the bimetal and the nut 87 so that the bimetal 67 floats or rocks slightly about the nut 87. The shoulder 88 of the nut defines a reaction point for the center of the bimetal 67. When heated, the bimetal 67 becomes bowed and the finger 90 engages the resilient spring 73 and the center and lower end of the bimetal engage their respective reaction points 88 and 85. Further heating of the bimetal forces the contact 69 out of engagement with the contact 68. Upon cooling, the finger 90 retracts from the spring 73 which biases the contact 69 into engagement with the contact 68. Further cooling of the bimetal 67 separates the finger 90 and spring 73.

As shown, the bimetal 67 is disposed adjacent the heater 17 and is heated primarily by the radiant heat of the heater 17. In this connection, an opening 91 is formed in the reflecting plate 20 in order that the bimetal 67 may be disposed close to the heater 17. Since the heat radiated by the heater 17 varies with the square of the voltage energizing the heater 17, the thermostat is voltage responsive. The thermostat is calibrated so that it will attain its switch-opening temperature just at the end of a first toasting period when the toaster structure is at room temperature at the beginning of the period, with the color control knob set at "light," and with the voltage at its lowest expected value, for example, 100 volts. Under other conditions, the thermostat 66 will cycle during the toasting period to energize and deenergize the heaters 17. When the voltage is increased, the heating of the bimetal 67 is more rapid and the thermostat will cycle to reduce the percentage of time that the thermostat is closed. The floating support for the bimetal 67 limits the conduction of heat therefrom, it being understood that the toaster structure does not heat as rapidly or to as high temperature as the bimetal 67.

I have found that a toaster, constructed as described up to now for a given setting of the color control knob, produces toast of a uniform color with voltages ranging between 100 and 130 volts but after the toaster structure has been heated to approximately its saturated temperature. This occurs after about four operations, starting with a cold toaster. During the first four cycles, compensation of the bimetal 67 for ambient temperatures is required. Accordingly, a second or compensating bimetal element 92 is employed for adjusting the bimetal 67 relative the spring 73 and, therefore, the temperatures of the bimetal 67 at which the contacts 68—69 are opened. The compensating bimetal 92 is shielded by the T-shape member 77 from the radiant heat of the heaters 17 so that it responds, primarily, to the amibent temperature of the toaster structure. The bimetal 92 is fixed at one end to the T-shape member 77 by a rivet 93 and the lower, free end of the bimetal 92 bears on the end of pin 84. As the bimetal 92 heats, the lower end thereof deflects to the right as viewed in Fig. 3 and, therefore, the reaction point or shoulder 85 moves to the right under the influence of the main bimetal 67. The positions of the bimetals 67 and 92 shown in Fig. 3 are those prevailing at room temperature and at the beginning of a first operation of the toaster. For succeeding operations, the bimetal 67 will be bowed due to residual heat so that it will be actuated to its switch-opening position faster than when started cold. However, the shifting of the reaction point 85 to the right provides for greater bowing of the main bimetal 67 to open the contacts 68—69. After about four cycles, the toaster structure becomes thermally saturated and the position of the compensating bimetal 92 becomes fixed.

The compensated thermostat structure 66, as described, I have found compensates perfectly for a voltage range of 100 to 130 volts to produce toast of uniform color. The thermostat structure 66, by cycling, controls the watt-hour input to the heaters 17 to provide for this operation. The watt-hour input is progressively reduced from the first operation of the toaster to the fifth operation after which the toaster structure becomes thermally saturated and the input is then maintained substantially constant. I have found, however, that the range of color of the toast provided by the color control mechanism between "light" and "dark" is insufficient where the toasting periods are held to 60 seconds for light toast and 130 seconds for dark toast. To increase the duration of the toasting period beyond 130 seconds is unsatisfactory from the standpoint of the user.

In order to provide a greater range of color of the toast produced in the three settings, I propose to vary the rate of heat transfer from the elements 17 to the bimetal 67 in the "light," "medium" and "dark" settings of the color control handle 51. This operation is effected by varying the spacing of the bimetal 67 relative the heater 17. In the "light" setting of the color control knob 51, the bimetal 67 is closely spaced with respect to the heater and the spacing is progressively increased as the color control knob is moved toward the "dark" setting thereof. Preferably, this operation is carried out by shifting the thermostatically operated switch structure 66 bodily with respect to the elements 17 and, to this end, the frame 76 is pivotally carried by the partition 14.

As shown, the frame 76 includes a flange portion 95 having vertically spaced openings 96 formed therein for receiving ears 97 which are upturned from the partition 14. A clearance is provided between the ears 97 and the openings 96 in order to permit a rocking movement between the frame 76 and the ears 97 in a generally horizontal plane. The flange portion 95 bears on shoulders 98 formed on the ears 97 and a compression spring 99 holds the flange 95 in engagement with the shoulders 98. The spring bears on the head of a screw 100 which is threaded in the partition 14. It will be understood that the frame 76 may be pivoted to the toaster structure in any other well-understood manner. Shifting of the frame 76 horizontally toward and away from the heating elements 17 is effected by a pin 101 which is fixed to the lever 39 and which rides in a slot 102 formed in the frame 76. It will be noted from Fig. 4 that, as the color control knob 51 is moved from the "dark" setting, as shown, to the "light" setting, the pin 101 moves downwardly in the inclined slot 102 and cams the frame 76 toward the heating element 17 and about the pivoting ears 97. Conversely, movement of the color control handle 51 from "light" to "dark" would effect movement of the frame 76 away from the element 17 to increase the spacing therebetween.

From the foregoing, it will be understood that by reducing the transfer of radiant heat from the heaters 17 to the bimetal 67 in the "medium" and "dark" settings, the percent time "off" in the operation of the thermostat structure 66 is reduced and, accordingly, the watt-hour input to the heaters is increased. Accordingly, a greater range of color between "light" and "dark" settings of the control knob 51 is assured by the difference in duration of the toasting periods as well as by the increased watt-hour input difference to the heaters 17 resulting from the changed spacing of the thermostat 66 relative the heaters 17 in the darker and lighter settings.

For perfect operation, it is important that the bimetal 67 is heated to its switch open position prior to the end of a toasting operation which is initiated with a cold toaster. I have found that, for a normal voltage, a calibrated temperature can be selected for the bimetal 67 which, in conjunction with the shifting of the bimetal 67 relative the heaters 17, will enable the bimetal to just reach its switch open temperature at the end of a first operation of the toaster in all of the selectable positions of the color control handle 51. Accordingly, more rapid heating of the toaster structure is effected than where the bimetal 67 operates to cycle its switch contacts during a first operation of the toaster. This rapid preheating of the toaster is a further feature of this control.

From the foregoing description, it will be apparent that I have provided an improved toaster wherein the watt-hour input to the heaters is controlled to produce toast of different colors, which colors are maintained uniform regardless of variations in voltage or whether a toasting operation is initiated with a cold toaster or one heated by prior operations. The range of colors of the toast is obtained by varying the duration of the toasting period as well as by varying the rate of energization of the heaters in the different positions of the color control.

While the invention has been shown in but one form, it will be obvious to those skilled in the art that it is not so limited, but is susceptible of various changes and modifications without departing from the spirit thereof.

What is claimed is:

1. In a toaster, the combination of a casing structure defining a toasting oven therewithin, an electric heater within the oven, a slice carrier movable between a nontoasting and a toasting position within the oven, a time-controlled mechanism for retaining the slice carrier in toasting position for a selected period of time and for actuating the carrier to its nontoasting position at the conclusion of said period of time, means for adjusting the time-controlled mechanism for determining, solely, the duration of said period of time, an electric circuit for energizing said heater, a switch controlling said circuit and actuated to closed and open positions in response respectively to movements of said carrier to toasting and nontoasting positions, a second switch connected in series with the first switch, a thermostat for opening and closing said second switch in response to predetermined high and low temperatures, said thermostat being spaced from said heater and subjected directly to the radiant heat thereof, and means interconnecting said adjusting means and the thermostat for varying the spacing of the thermostat and heater, said interconnecting means increasing said spacing as the adjusting means is actuated to increase said period of time and vice versa.

2. In a toaster, the combination of means defining a toasting oven, heating means within the oven, a slice carrier movable between a nontoasting position and a toasting position, means biasing the carrier to its nontoasting position, a time-controlled latching mechanism for retaining said carrier in toasting position for a predetermined period of time and for releasing the carrier at the conclusion of said period, means for adjusting said latching mechanism for determining, solely, the duration of said period of time, an electric circuit for energizing said heating means and including a switch actuated to closed position in response to movement of the carrier to its toasting position, said switch being opened in response to movement of the carrier to its nontoasting position, a thermostat spaced from but subjected directly to the radiant heat of said heating means, a second switch connected in said circuit in series with said first switch and actuated by the thermostat to open and closed positions in response to respective predetermined high and low temperatures of the thermostat and means actuated by said adjusting means for varying the spacing of said thermostat relative the heating means, said thermostat being relatively close to the heating means when said adjusting means is adjusted to provide a toasting period of relatively short duration, said spacing of the thermostat and the heating means increasing progressively as the adjusting means is actuated to increase the duration of the toasting period.

3. In a toaster, the combination of a casing structure defining a toasting oven, a heating element disposed within the oven for toasting slices of bread, a slice carrier movable within the oven between an upper nontoasting position and a lower toasting position, a time-controlled mechanism for retaining said carrier in toasting position for fixed periods of time and for moving the carrier to nontoasting position at the conclusion of said periods of time, selecting means for adjusting the time-controlled mechanism and determining, solely, the duration of said periods of time, a frame movably supported by the casing structure, a bimetal member carried by the frame and subjected directly to heat radiated by the heating element, an electric circuit for the heating element and including a switch carried by the frame and actuated to open and closed positions by the bimetal member in response to respective, predetermined, high and low temperatures thereof, means interconnecting said selecting means and said frame for moving the bimetal member toward and away from the heating element as the selecting means is adjusted to reduce and increase, respectively, said periods of time that the carrier is retained in toasting position and means for energizing the electric circuit in response to movement of the carrier to its toasting position.

4. In a toaster, the combination of a casing structure defining a toasting oven, a heating element disposed within the oven for toasting slices of bread, a slice carrier movable within the oven between an upper nontoasting position and a lower toasting position, a time-controlled mechanism for retaining said carrier in toasting position for fixed periods of time and for moving the carrier to nontoasting position at the conclusion of said periods of time, selecting means for adjusting the time-controlled mechanism and determining, solely, the duration of said periods of time, said selecting means including a lever pivoted to said casing structure and a handle for moving said lever, a frame movably supported by the casing structure, a bimetal member carried by the frame and subjected directly to heat radiated by the heating element, an electric circuit for the heating element and including a switch carried by the frame and actuated to open and closed positions by the bimetal member in response to respective, predetermined, high and low temperatures thereof, means defining a pin-and-slot connection interposed between said frame and said lever for moving the frame toward and away from the heating element as the selecting means is adjusted to reduce and increase, respectively, said periods of time that the carrier is retained in toasting position and means for energizing the electric circuit in response to movement of the carrier to its toasting position.

References Cited in the file of this patent

UNITED STATES PATENTS

| Number | Name | Date |
| --- | --- | --- |
| 2,007,596 | Burke | July 9, 1935 |
| 2,147,386 | Sardeson | Feb. 14, 1939 |
| 2,162,899 | Sardeson | June 20, 1939 |
| 2,337,124 | Olving | Dec. 21, 1943 |
| 2,339,183 | Myers | Jan. 11, 1944 |
| 2,364,175 | Turner | Dec. 5, 1944 |
| 2,367,500 | Huck | Jan. 16, 1945 |
| 2,412,727 | Gomersall et al. | Dec. 17, 1946 |
| 2,468,996 | Olson | May 3, 1949 |